United States Patent
Avery et al.

(10) Patent No.: US 9,747,292 B2
(45) Date of Patent: Aug. 29, 2017

(54) SIMPLIFYING THE CHECK-IN OF CHECKED-OUT FILES IN AN ECM SYSTEM

(71) Applicant: International Business Machines Corporation, Armonk, NY (US)

(72) Inventors: Kenytt D. Avery, Newport Beach, CA (US); Edward L. Bader, Los Angeles, CA (US); Jean-Marc Costecalde, Irvine, CA (US); Patricia V. Gatewood, Costa Mesa, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 14/536,454

(22) Filed: Nov. 7, 2014

(65) Prior Publication Data
US 2016/0132525 A1   May 12, 2016

(51) Int. Cl.
*G06F 17/30* (2006.01)

(52) U.S. Cl.
CPC .. *G06F 17/30091* (2013.01); *G06F 17/30076* (2013.01); *G06F 17/30106* (2013.01); *G06F 17/30171* (2013.01); *G06F 17/30203* (2013.01)

(58) Field of Classification Search
CPC ......... G06F 17/30106; G06F 17/30076; G06F 17/30091; G06F 17/2288; G06F 17/30011; G06F 17/30309; G06F 17/30067; G06F 17/30165; G06F 17/30168; Y10S 707/99931; Y10S 707/99938; Y10S 707/99952; Y10S 707/99954; G05B 2219/24169

USPC ......... 707/695, 769, 783; 709/217; 717/170; 726/27

See application file for complete search history.

(56) References Cited

U.S. PATENT DOCUMENTS

| | | | | |
|---|---|---|---|---|
| 6,088,694 | A * | 7/2000 | Burns | G06F 11/1451 |
| 6,260,040 | B1 * | 7/2001 | Kauffman | G06F 17/30067 |
| 6,460,052 | B1 * | 10/2002 | Thomas | G06F 17/30309 |
| | | | | 707/695 |
| 7,222,131 | B1 * | 5/2007 | Grewal | G05B 19/05 |
| | | | | 707/695 |
| 7,437,712 | B1 * | 10/2008 | Brown | G06F 8/71 |
| | | | | 717/121 |
| 7,895,155 | B2 | 2/2011 | Herbeck et al. | |
| 7,908,665 | B2 | 3/2011 | Chase | |

(Continued)

OTHER PUBLICATIONS

List of IBM Patents or Patent Applications Treated as Related.
(Continued)

*Primary Examiner* — Dennis Truong
(74) *Attorney, Agent, or Firm* — Patterson + Sheridan, LLP

(57) ABSTRACT

Techniques are disclosed for managing a file stored in an enterprise content management (ECM) repository. In response to a check-out request from a client machine for a file stored in the ECM repository, a management application for an ECM system identifies ECM-related metadata associated with the file. The management application stores the ECM-related metadata into the file (or an associated file) prior to sending the file to the client. At check-in for the file, the management application identifies the location of the corresponding file in the ECM repository using the metadata previously stored in the file sent to the client.

20 Claims, 5 Drawing Sheets

(56) References Cited

U.S. PATENT DOCUMENTS

| | | | |
|---|---|---|---|
| 7,945,589 B1* | 5/2011 | Weiss | G06F 8/71 |
| | | | 707/795 |
| 9,465,784 B1* | 10/2016 | Hagopian | G06F 17/30011 |
| 2004/0225730 A1 | 11/2004 | Brown et al. | |
| 2006/0101443 A1* | 5/2006 | Nasr | G06F 8/71 |
| | | | 717/163 |
| 2006/0230050 A1* | 10/2006 | Rehfeld | G06F 17/30887 |
| 2007/0112787 A1* | 5/2007 | Burton | G06F 17/301 |
| 2007/0174281 A1* | 7/2007 | Chase | H04N 7/17318 |
| 2010/0082700 A1* | 4/2010 | Parab | G06F 17/30156 |
| | | | 707/803 |
| 2015/0177954 A1* | 6/2015 | Wei | G06F 3/0482 |
| | | | 715/738 |

OTHER PUBLICATIONS

Avery et al.; "Method to Simplify the Check-In of Checked-Out Files in an ECM System"; U.S. Appl. No. 14/692,958, filed Apr. 22, 2015.

* cited by examiner

SIMPLIFYING THE CHECK-IN OF CHECKED-OUT FILES IN AN ECM SYSTEM

BACKGROUND

The present disclosure relates to enterprise content management (ECM), and more specifically, to storing ECM check-in information to a file or associated file sent to a client computer.

Many organizations use ECM systems to store electronic content, such as documents, multimedia, and binary applications. Further, ECM systems provide mechanisms for document management. Generally, a user requesting access to a given file stored on an ECM system must "check-out" the file. When a user checks out a file, the ECM system sends a copy of the file stored on the system to the local machine of the user. While the file is checked out by a user, other users have limited access to the file (e.g., other users may be able to view but not modify the file) to maintain consistency. Full access to the file may be restricted until the user checks-in the file. At check-in, updates made by the user to the local file are committed to the corresponding file stored on the ECM system.

However, the check-in process on the user side may be cumbersome. Typically, a user accesses the ECM system via a web interface. When checking-in a file to the ECM system, the user has to, via the interface, identify the corresponding file on the ECM system, select the updated file on the local machine, and then upload the document. Such an approach requires a fair amount of manual steps, especially where folder hierarchies for the file on either system are deep. For example, the user may need to perform a series of mouse clicks to navigate directories when determining the location of the file on the local system and then again on the ECM system. Current approaches to address this issue include using a file tracking application on the local machine. The file tracker is a client-side ECM tool that facilitates finding a document from a hard drive during the check-in process by tracking a status of a checked-out document. However, the file tracker can fail if the user moves the document to another location after checking the file out from the ECM system (e.g., if the user e-mails the checked-out document to another user). Therefore, the check-in process is time-consuming and inefficient.

SUMMARY

One embodiment presented herein describes a method. The method generally includes receiving, via a processor, a request to check-out a file stored in an ECM content repository. The method also storing, in the file, metadata identifying a location of the file in the ECM content repository. The file is sent to a requesting client. The file is designated as checked-out from the ECM content repository.

Another embodiment presented herein describes a system having a processor and a memory storing a program, which, when executed on the processor, performs an operation. The operation itself generally includes receiving a request to check-out a file stored in an ECM content repository. The operation also storing, in the file, metadata identifying a location of the file in the ECM content repository. The file is sent to a requesting client. The file is designated as checked-out from the ECM content repository.

Another embodiment presented herein describes a computer program product having computer-readable program code configured to perform an operation. The operation itself generally includes receiving, via a processor, a request to check-out a file stored in an ECM content repository. The operation also storing, in the file, metadata identifying a location of the file in the ECM content repository. The file is sent to a requesting client and designated as checked-out from the ECM content repository.

DETAILED DESCRIPTION

Embodiments presented herein describe techniques for managing content stored by an enterprise content management (ECM) system. More specifically, techniques presented herein disclose storing ECM-related metadata in the file during the check-out process. The metadata provides information that the ECM system uses to identify a location of the corresponding file as stored in a content repository of the ECM system. For example, such information may include a file ID, version, location, and the like.

In one embodiment, when a client checks out a file from the content repository, the ECM system determines how to store the metadata with the file being checked out. For example, if a format associated with the file supports arbitrary metadata, the ECM system may embed such metadata within the file. However, if the file format does not support arbitrary metadata but provides metadata fields, the ECM system may modify or add ECM-related metadata to existing metadata (e.g., an author field of the file). Further, the ECM system may store the metadata using a file system fork in the event that the file format does not support additional metadata. In each case, the ECM system stores the metadata with the file as part of checking out the file to the client. Once checked out, the client can update the file.

In one embodiment, when the client checks-in the file, the ECM system evaluates the ECM-related metadata embedded with the file. As stated, the metadata allows the ECM system to identify the location of the corresponding file stored in the ECM system repository. Once identified, the ECM system updates the file located on the ECM system (based on updates made by the client) and completes the check-in process. Advantageously, storing ECM-related metadata in a file during check-out simplifies the check-in process. That is, the ECM system can leverage the stored metadata and automatically identify the location of the file, without requiring the user to specify the location of the corresponding file in the ECM system repository. Doing so may also provide better efficiency in cases where a user e-mails a checked-out document to another user for updating. Because the ECM system automatically determines where a file corresponding to a checked-out file is located in the content repository, the second user can check-in the file without needing to know where the document was originally located, which addresses the issue raised by file tracker applications that require a file having to be stored in a fixed location once checked-out.

Figure 1:
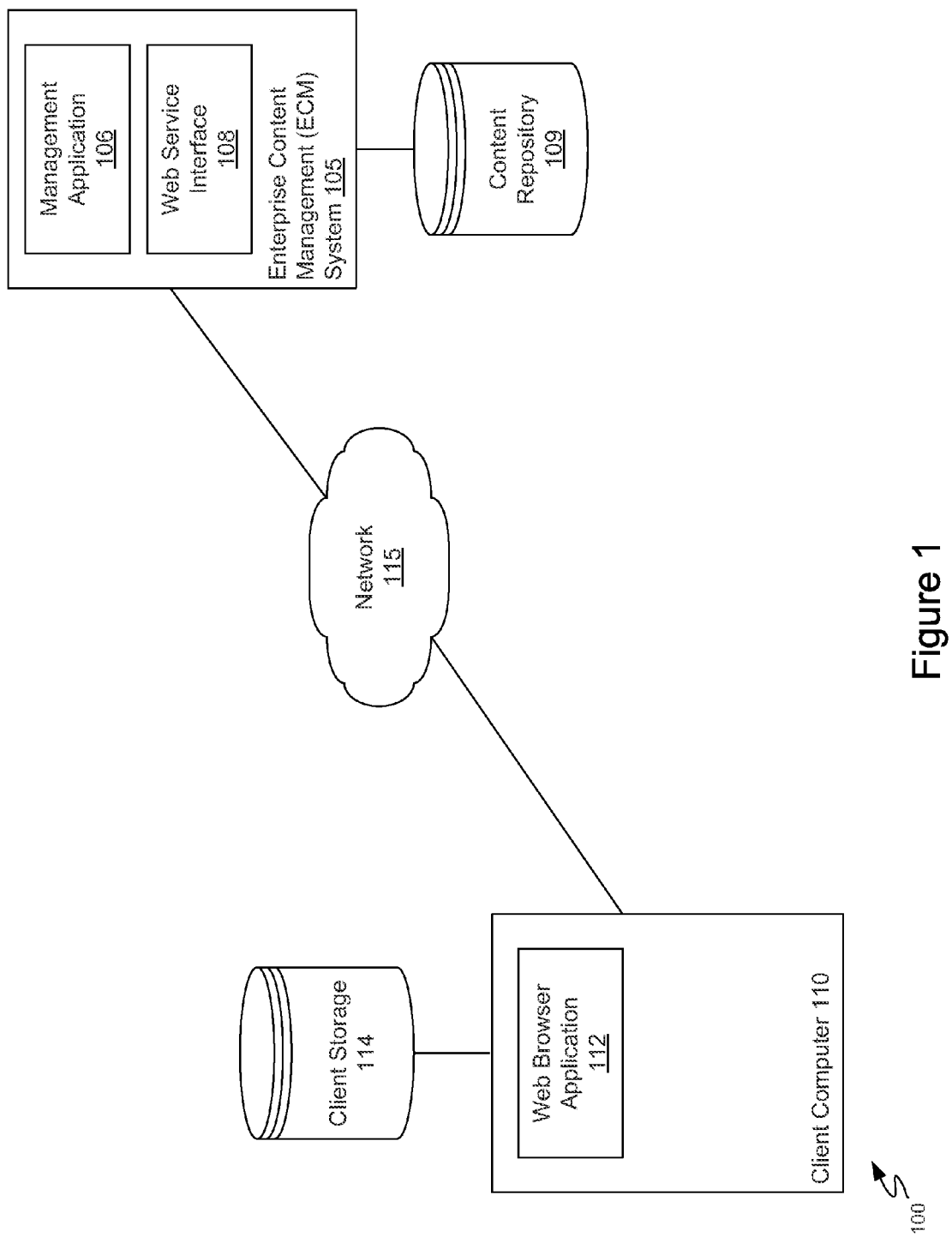
FIG. 1 illustrates an example computing environment, according to one embodiment.

FIG. 1 illustrates an example computing environment 100, according to one embodiment. As shown, the computing environment 100 includes an enterprise content management (ECM) system 105. The ECM system 105 organizes and stores content (e.g., documents, multimedia, and the like) in a content repository 109. The ECM system 105 may be a physical computing system or a virtual machine instance in a computing cloud.

Further, the ECM system 105 includes a management application 106 and a web service interface 108. The management application 106 controls creation and storage of files in the content repository 109. The management application 106 allows users to, via a network 115, access content stored in the content repository 109 through a check-in and check-out process. The web service interface 108 provides an interface for the management application 106 to provide users with access to the content. For example, a web browser application 112 executing on a client computer 110 may log onto the ECM system 105 via the web service interface 108.

The web service interface 108 can list files stored in the content repository that are available for check-out, enforce access control rules, and associate files with a broad variety of metadata used to manage content within the repository. For example, documents may be grouped by subject matter within an enterprise. The client can select files to check-out and download locally (e.g., to client storage 114). Generally, while a file is checked-out by a given client, other clients are prevented from modifying the file. However, certain configurations of the management application 106 may allow clients to download a read-only copy of the checked-out file. Further, the web service interface 108 allows the client to upload previously checked-out files through a check-in process.

In one embodiment, the management application 106 embeds ECM-related metadata in the file (or an associated file, such as a file system fork) during check-out of a file. The ECM-related metadata may include information used to identify the file relative to the content repository 109. For example, the ECM-related metadata includes an identifier used by the management application 108 to catalog files in the content repository 109. The identifier may be a globally unique identifier (GUID), an auto-incrementing number, a randomly generated long number, etc. The ECM-related metadata may also include version information of the file to be checked-out by the client. Such information is useful in cases where the management application 106 allows users to specify versions of a given document. Other examples of metadata that the management application 106 may embed are titles of a document, author of a document, etc.

In one embodiment, the management application 106 determines a method for storing the metadata to a client computer 110 when checking out a given file. For instance, the management application 106 may determine whether a format of the file supports additional metadata. For example, some file formats, such as Portable Document Format (PDF) or JPEG, support arbitrary metadata. For these file formats, the management application 106 can store the ECM-related metadata in new metadata fields of the file itself. As another example, for file formats that do not support arbitrary metadata, such as older versions of some word processor document formats, the management application 106 can store the ECM-related metadata in a given metadata field of a file, such as an author metadata field of a document.

For file formats that do not support additional metadata, the management application 106 can use a file system fork (e.g., Windows Alternate Data Stream, MacOS Resource Fork, UNIX extended attributes) to store the metadata. That is, the management application 106 may store ECM related metadata in file system metadata. In such a case, the management application 106 uses operating system and file system information of the client computer 110 to determine how to format the ECM-related metadata. The management application 106 can be configured to recognize certain file formats and store ECM-related metadata based on an identified file format.

Once stored, the management application 106 sends the file to the client computer 110. The client computer 110 can check that file back into the ECM system 105 (e.g., after performing updates to the file). The web interface server 108 may provide a drag-and-drop interface that allows a user to check-in the file on the local client computer 110 through the web browser application 112. At check-in, the management application 106 retrieves the ECM-related metadata from the file (or fork). The management application 106 then determines the location for storing the file in the content repository 109, without requiring the user to manually determine the location through a series of clicks via the web interface service 108. That is, the user selects the file to check-in, and the management application 106 automatically updates the corresponding file on the content repository 109.

Figure 2:
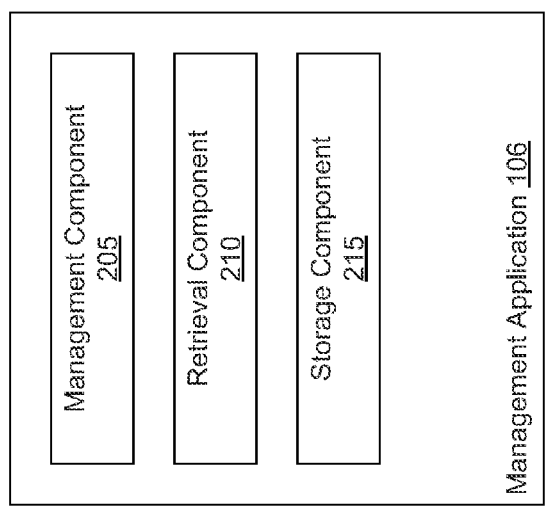
FIG. 2 further illustrates the management application described relative to FIG. 1, according to one embodiment.

FIG. 2 further illustrates the management application 106, according to one embodiment. As shown, the management application 106 includes a management component 205, a retrieval component 210, and a storage component 215. In one embodiment, the management component 205 controls user access to files stored in the content repository 109. For instance, the management component 205 receives check-out and check-in requests from the client computer 110. The management component 205 can decide whether to reject check-out or check-in requests for a file based on a status of the file, e.g., such as whether a requesting user may access the file, whether the file is already checked-out, whether a file that is being checked in is an older version of a file, etc.

The retrieval component 210 obtains ECM-related metadata in response to a check-out request for a file. As stated, such metadata may include a GUID, version, and other information associated with the file that the management component 210 can use to identify the file in the content repository 109. Retrieving the ECM-related metadata allows the storage component 215 to embed the data in a file (or fork associated with the file) prior to sending the file to the requesting client.

The storage component 215 embeds the ECM-related metadata obtained by the retrieval component 210 into a file requested for check-out (or into a fork associated with the file). The storage component 215 determines how to store the metadata into the file based on the file format. As stated, various methods exist for storing the metadata based on the file format. For instance, if the file format supports arbitrary metadata, the storage component 215 embeds the metadata to a metadata field of the file. As another example, the storage component 215 embeds the metadata within an existing metadata field of the file. Actions on how to store metadata within a file may be specified in a configuration of the management application 106.

In one embodiment, the retrieval component 210 obtains the ECM-related information from an uploaded file (or associated fork) at file check-in. To do so, the retrieval component 210 may evaluate the file format to determine how the metadata was stored with the file. For example, if the file associated with the check-in request is a PDF file, then the retrieval component 210 may determine that the metadata is stored in an arbitrary metadata field. Once determined, the retrieval component 210 obtains the metadata. The retrieval component 210 may then identify the location of the corresponding file in the content repository 109 based on the information. Once identified, the management component 205 may update the file.

Figure 3:
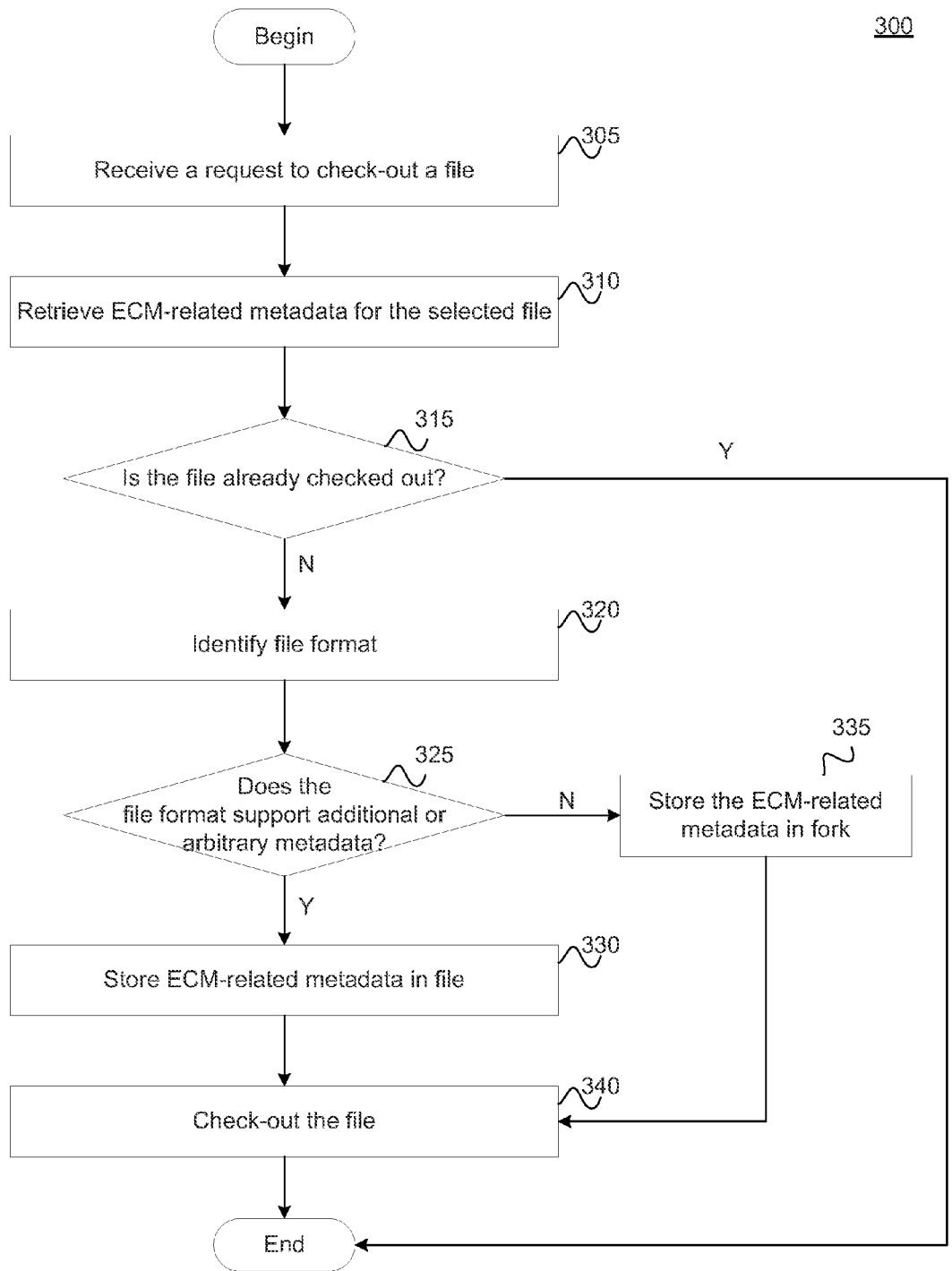
FIG. 3 illustrates a method for checking out a file from an enterprise content management system, according to one embodiment.

FIG. 3 illustrates a method 300 for checking-out a file stored in an ECM system repository, according to one embodiment. As shown, method 300 begins at step 305, where the management component 205 receives a request to check-out a file stored in the content repository 109. A user may select the file for check-out through the web service interface 108. At step 310, the retrieval component 210 obtains ECM-related metadata for the selected file. For example, the retrieval component 210 may obtain a GUID associated with the file as well as version information. The management component 205 may use this information to later identify the location of the file.

At step 315, the management component 205 determines whether the file is already checked-out. The management component 205 may reject the check-out request if the file is checked-out. In such a case, method 300 ends. However, if the file is not currently checked-out, the storage component 215 identifies the file format of the selected file (at step 320). Doing so allows the storage component 215 to determine how to store the ECM-related metadata for the file.

At step 325, the storage component 215 determines whether the file format supports additional or arbitrary metadata. If so, then at step 330, the storage component 215 stores the ECM-related metadata to the file. If not, then the storage component 215 determines the operating system associated with the check-out request. At step 335, the storage component 215 stores the ECM-related metadata in a file system fork associated with the file. The storage component 335 may format the metadata to be compatible with the operating system. At step 340, the management component 205 checks-out the file to the requesting client. Once checked out, the management component 205 may designate the file as checked-out from the content repository 109. The client can modify the file as needed. Further, other clients may be restricted from modifying the file. Note, the order of the above steps is not fixed. That is, a configuration of the storage component 215 can specify what actions to take upon identifying a file format of a given file specified in a check-out request. For example, if the file format corresponds to a file that does not support arbitrary metadata, the storage component 215 can automatically store the ECM-related metadata in a file system fork without first making such a determination.

Figure 4:
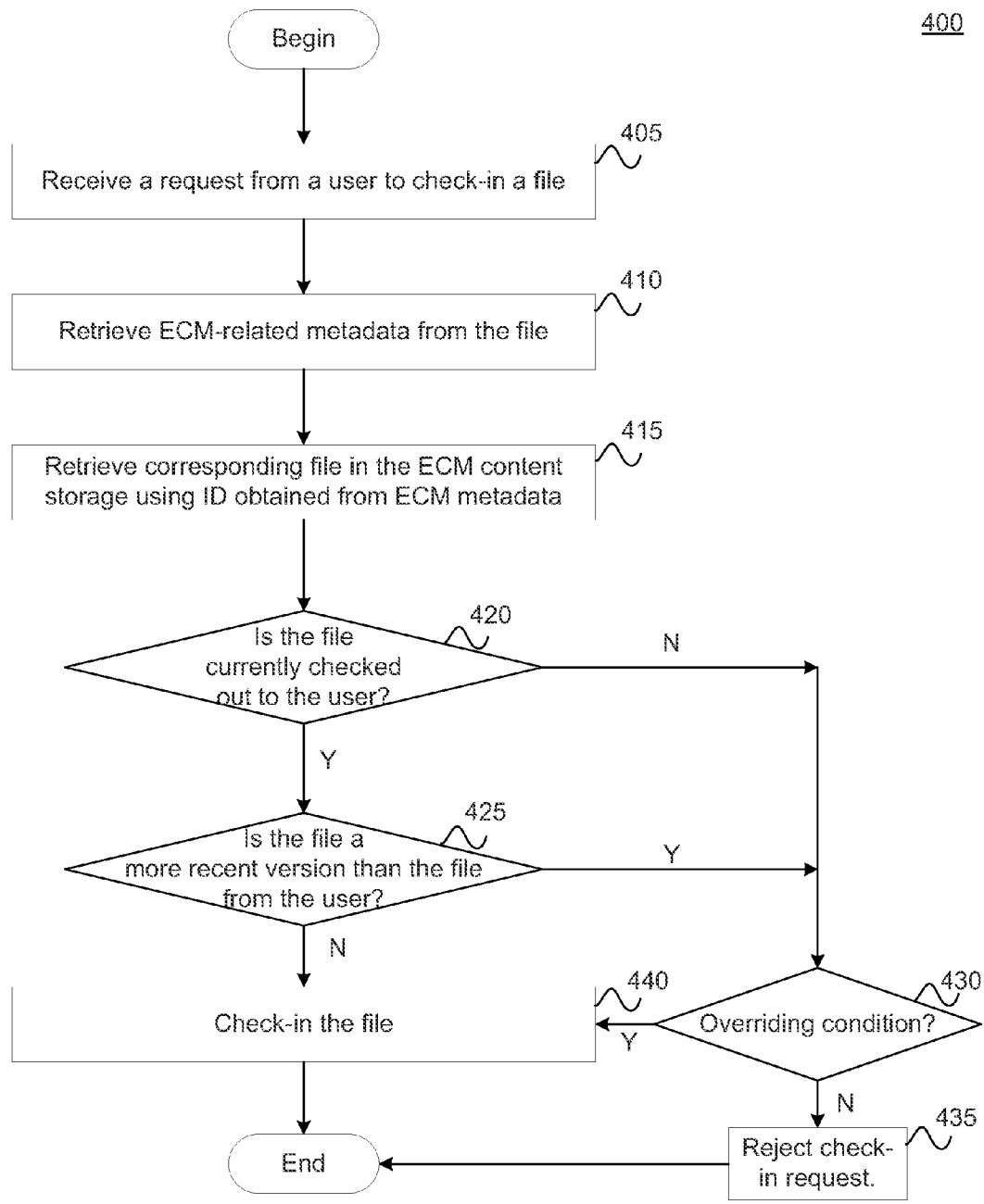
FIG. 4 illustrates a method for checking in a file to an enterprise content management system, according to one embodiment.

FIG. 4 illustrates a method 400 for checking-in a file to an ECM system, according to one embodiment. As shown, method 400 begins at step 405, where the management component 205 receives a request from a user to check-in a file. At step 410, the retrieval component 210 obtains ECM-related metadata from the file. To do so, the retrieval component 210 may identify the file format of the file associated with the request. The retrieval component 210 may then determine where ECM-related metadata would be stored for that particular format based on the configuration of the management application 106. For instance, if the request is for a JPEG file, the configuration may specify that the metadata is located in an arbitrary metadata field. The retrieval component 210 obtains the metadata from that field.

The management component 205 identifies the location of the file based on the ECM-related metadata. To do so, the management application 205 may evaluate the GUID of stored with the file and cross-check the GUID with GUIDs of files in the content repository 109. At step 415, the management component 205 retrieves the corresponding file in the content repository 109 from the identified location.

At step 420, the management component 205 then determines whether the file is currently checked out to the user sending the check-in request. If not, then the management component 205 determines whether any overriding conditions exist (at step 430). For example, the ECM system 105 may be configured to allow other users to check-in a file on behalf of another user. Doing so allows a user to e-mail a checked-out file to other users. In such a case, the management component 205 can check-in the file, provided that version criteria is also satisfied (at step 440). However, if no overriding condition exists, then the management component 205 rejects the check-in request.

If the file is currently checked-out to the user, then the management component 205 determines whether the file stored on the content repository 109 is a more recent version than the file uploaded by a user (at step 425). If so, then the management component 205 determines whether any overriding conditions exist (at step 430). If so, then at step 440, the management component 205 checks-in the file. If not, then the management component 205 rejects the check-in request.

If the file stored in the content repository 109 is not a more recent version, then at step 440, the management component 205 checks-in the file. The management component 205 incorporates the changes made to the file by the client and makes the file available to other authorized users for check-out.

Figure 5:
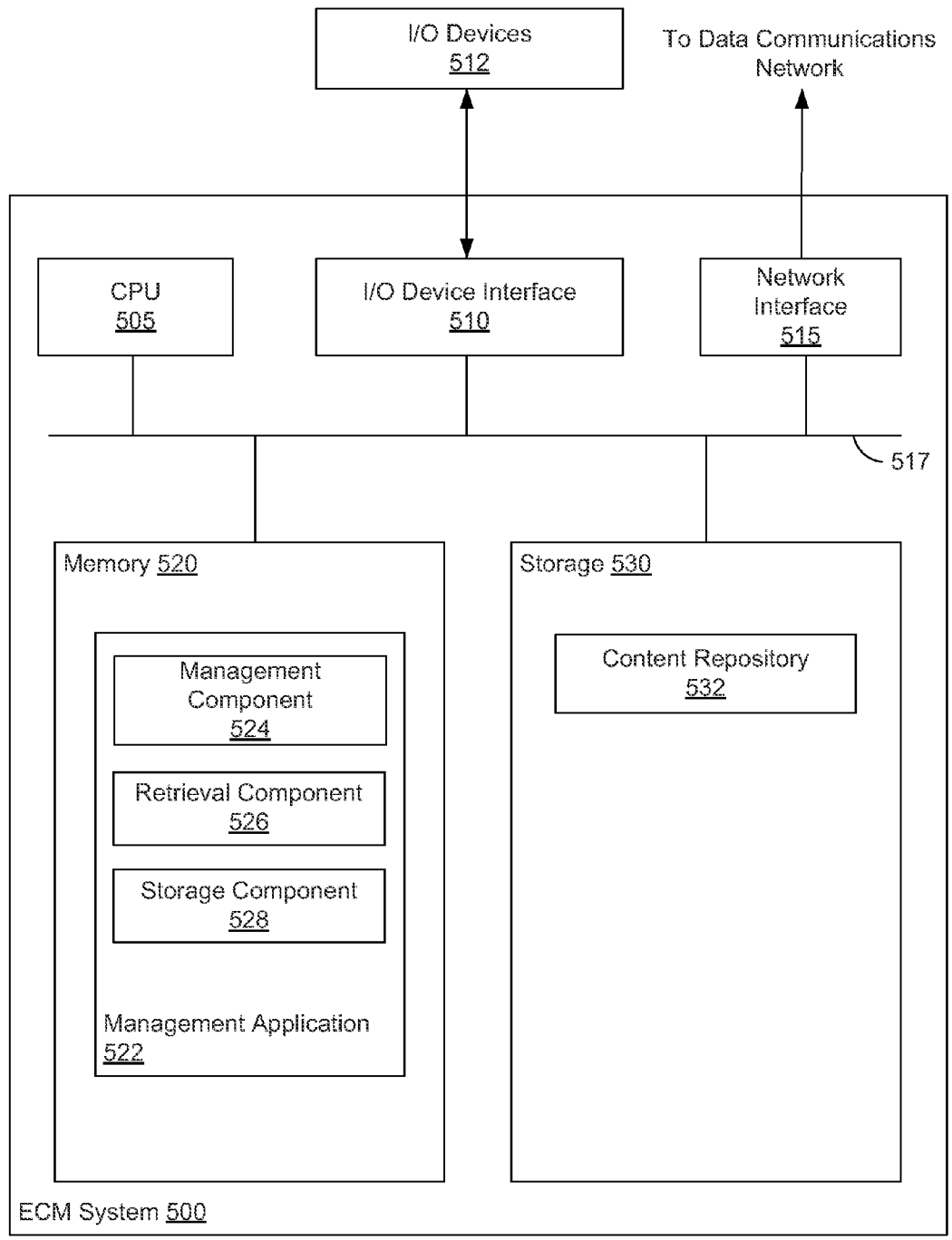
FIG. 5 illustrates an example enterprise content management system, according to one embodiment.

FIG. 5 illustrates an example ECM system 500, according to one embodiment. As shown, the server computing system 500 includes, without limitation, a central processing unit (CPU) 505, a network interface 515, a memory 520, and storage 530, each connected to a bus 517. The ECM system 500 may also include an I/O device interface 510 connecting I/O devices 512 (e.g., keyboard, display and mouse devices) to the ECM system 500. Further, in context of this disclosure, the computing elements shown in the ECM system 500 may correspond to a physical computing system (e.g., a system in a data center) or may be a virtual computing instance executing within a computing cloud.

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 517, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes a management application 522. And storage 530 includes a content repository 532. The management application 522 controls creation and storage of files in the content repository 532. The management application 522 also controls access to the files in the content repository 532.

The management application 522 further includes a management component 524, a retrieval component 526, and a storage component 528. The management component 524 controls the check-out and check-in processes for a file. For instance, the management component 524 may determine whether a given file may be checked-out by a certain client, or whether a file is already checked-out to a client, etc. At any rate, the management component 524 receives requests from clients to check-in or check-out a file stored in the content repository 532.

Further, during check-out of a file, the management application 522 is configured to store ECM-related metadata (e.g., information identifying the location of the file in the content repository 532) in the file or an associated fork. To do so, when a client sends a check-out request, the retrieval component 526 identifies ECM-related metadata associated with the file. The storage component 528 then embeds the metadata to the file (or an associated fork) based on the file format.

At check-in of the file, the management application 522 can use the embedded ECM-related metadata to identify the location of the file in the content repository 532. To do so, at file check-in, the retrieval component 526 determines a format of the file to identify where the ECM-related metadata is stored. The metadata allows the management application to locate and update the file.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the web interface service or related data available in the cloud. For example, the management application 106 could execute on a computing system in the cloud and store ECM-related metadata associated with the file to the file itself (or a file fork) during check-out of a file. In such a case, the management application 106 could retrieve the ECM-related metadata from a file stored in the content repository residing at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
 a processor; and
 a memory storing a program executable by the processor to perform an operation comprising:
  responsive to receiving a request to check-out a file stored in a content repository, determining a file format of the file;
  upon determining that the file format does not support storing desired metadata within the file, storing, in a file system fork associated with the file, information identifying a location of the file in the content repository, wherein the file system fork is of a format specific to a specified file system;
  sending the file to a requesting client;
  designating the file as checked-out from the content repository; and
  responsive to receiving a request to check-in the file, automatically identifying the location of the file in the content repository, based on the stored information.

2. The system of claim 1, wherein the operation further comprises:
 checking-in the file to the content repository.

3. The system of claim 1, wherein checking-in the file comprises:
 identifying one or more modifications made to the file;
 updating the file stored in the content repository based on the one or more modifications; and
 designating the file as checked-in to the content repository.

4. The system of claim 1, wherein the information further includes at least one of an identifier and a version number of the file in the content repository.

5. The system of claim 1, wherein the system is to manage the file stored in the content repository, wherein information further includes an identifier and a version number of the file in the content repository, wherein the operation further comprises checking-in the file to the content repository, wherein checking-in the file comprises:
 identifying one or more modifications made to the file;
 updating the file stored in the content repository based on the one or more modifications; and
 designating the file as checked-in to the content repository.

6. The system of claim 5, wherein the file is checked-out to a first client computer and by a first user, wherein the file is transmitted via email from the first client computer to a second client computer of a second user, wherein the file is checked-in to the content repository from the second client computer and by the second user without first requiring the first user to check-in the file and without first requiring the second user to check-out the file, wherein the first and second client computers are different computers, wherein the first and second users are different users.

7. The system of claim 6, wherein the file is checked-in without requiring the file to be in a fixed location since being checked-out, wherein the file is checked-in without requiring any location of the file on the first client computer to be specified, wherein the file is checked-in based on a location of the file on the second client computer;
 wherein the location of the file in the content repository is automatically identified, wherein automatically identifying the location of the file in the content repository comprises identifying the location of the file in the content repository without requiring any user to specify the location of the file in the content repository.

8. The system of claim 7, wherein the system comprises a server system that is an enterprise content management (ECM) system having a plurality of components including a management application and a web service interface, wherein the content repository comprises an ECM content repository, wherein the program comprises the management application, wherein the ECM system is operatively connected to the ECM content repository and a respective web browser application on each of the first and second client computers.

9. The system of claim 8, wherein the management application in turn comprises a plurality of components including a management component, a retrieval component, and a storage component, wherein the management component controls user access to files stored in the ECM content repository, wherein the retrieval component obtains the information in response to the request to check-out the file, wherein the storage component determines whether the file format matches the at least one file format from the set of file formats identified as supporting arbitrary metadata.

10. The system of claim 9, wherein the second user is only permitted to check-in the file upon an overriding condition being satisfied, wherein the overriding condition comprises the ECM system being specifically configured to permit users to check-in a file on behalf of other users;
 wherein the storage component is configured to store the information in each type of file system fork selected from: (i) WINDOWS Alternate Data Stream; (ii) MACOS Resource Fork; and (iii) UNIX extended attributes;
 wherein the storage component is user-customizable in terms of types of actions taken by the storage component upon specified conditions being satisfied, the specified conditions including determining that the file format matches the at least one file format from the set of file formats identified as supporting arbitrary metadata.

11. The system of claim 10, wherein the operation further comprises, prior to sending the file to the requesting client:
 upon determining that the file format matches at least one file format from a set of file formats identified as supporting arbitrary metadata, storing the information into an arbitrary metadata field of the file; and
 upon determining that the file format includes one or more existing modifiable metadata fields, storing the information into the one or more existing modifiable metadata fields of the file.

12. The system of claim 1, wherein the operation further comprises, prior to sending the file to the requesting client:
 otherwise, upon determining that the file format supports storing desired metadata within the file, storing the information into a metadata field of the file, wherein the metadata field is selected from an arbitrary metadata field and an existing modifiable metadata field.

13. The system of claim 1, wherein the operation further comprises, prior to sending the file to the requesting client: otherwise, at least one of: (i) upon determining that the file format matches at least one file format from a set of file formats identified as supporting arbitrary metadata, storing the information into an arbitrary metadata field of the file; and (ii) upon determining that the file format includes one or more existing modifiable metadata fields, storing the information into the one or more existing modifiable metadata fields of the file.

14. The system of claim 1, wherein the operation further comprises, prior to sending the file to the requesting client:
upon determining that the file format matches at least one file format from a set of file formats identified as supporting arbitrary metadata, storing the information into an arbitrary metadata field of the file; and
upon determining that the file format includes one or more existing modifiable metadata fields, storing the information into the one or more existing modifiable metadata fields of the file.

15. The system of claim 1, wherein the format of the file system fork is selected from: (i) WINDOWS Alternate Data Stream; (ii) MACOS Resource Fork; and (iii) UNIX extended attributes.

16. A computer program product, comprising:
a computer-readable storage medium having computer-readable program code of a program embodied therewith, the computer-readable program code executable by a processor to perform an operation comprising:
responsive to receiving a request to check-out a file stored in a content repository, determining a file format of the file;
upon determining that the file format does not support storing desired metadata within the file, storing, in a file system fork associated with the file, information identifying a location of the file in the content repository, wherein the file system fork is of a format specific to a specified file system;
sending the file to a requesting client;
designating the file as checked-out from the content repository; and
responsive to receiving a request to check-in the file, automatically identifying the location of the file in the content repository, based on the stored information.

17. The computer program product of claim 16, wherein the operation further comprises:
checking-in the file to the content repository.

18. The computer program product of claim 16, wherein checking-in the file comprises:
identifying one or more modifications made to the file;
updating the file stored in the content repository based on the one or more modifications; and
designating the file as checked-in to the content repository.

19. The computer program product of claim 16, wherein the information further includes at least one of an identifier and a version number of the file in the content repository.

20. The computer program product of claim 16, wherein the format of the file system fork is selected from: (i) WINDOWS Alternate Data Stream; (ii) MACOS Resource Fork; and (iii) UNIX extended attributes.

* * * * *